United States Patent [19]

Sarlls, Jr.

[11] 4,253,481
[45] Mar. 3, 1981

[54] CUSHIONED SHUTTLE VALVE

[75] Inventor: Edward C. Sarlls, Jr., Alief, Tex.

[73] Assignee: Gilmore Valve Company, Bellaire, Tex.

[21] Appl. No.: 36,674

[22] Filed: May 7, 1979

[51] Int. Cl.³ .................... F16K 31/12; F16K 11/07
[52] U.S. Cl. .................................. 137/112; 137/113; 137/514.5
[58] Field of Search ...................... 137/113, 112, 514.5

[56] References Cited

U.S. PATENT DOCUMENTS 3,533,431  10/1970  Kuenzel ............................. 137/113

FOREIGN PATENT DOCUMENTS 970307  9/1964  United Kingdom ..................... 137/113

OTHER PUBLICATIONS

Hydraulic Shuttle Valves, Specification Sheet Number 103, Gilmore Valve Company.

Primary Examiner—William R. Cline
Attorney, Agent, or Firm—Murray Robinson; Ned L. Conley; David Alan Rose

[57] ABSTRACT

A shuttle valve includes a tubular body having two, coaxial, inlet ports at its ends, and a transverse outlet port at its side. An internally threaded connector ring is secured over each port by cap screws.

A cage having an external radial flange is telescopically disposed within each inlet port, with its flange clamped between the adjacent connector ring and an outwardly facing shoulder in the body. O-rings seal the three connector rings and the two cages to the body. Each cage has an inwardly protuberant O-ring secured at its outer end providing a valve seat. Inwardly of the seat each cage is axially grooved, providing flow passages. The ribs left between the grooves provide guide bearings. Adjacent the inner end of each cage are formed stop shoulders. Inwardly of the stop shoulders is a skirt or lip forming a dashpot cylinder.

A shuttle in the form of a cylindrical plug tapered at each end is axially slidably disposed inside the body within the cages, being supported and guided by the bearing portions thereof, and adapted alternately to engage the seat of one or the other of the cages according to whether the pressure on one end of the shuttle or the other is higher. A collar around the middle of the shuttle provides a dashpot piston.

5 Claims, 6 Drawing Figures

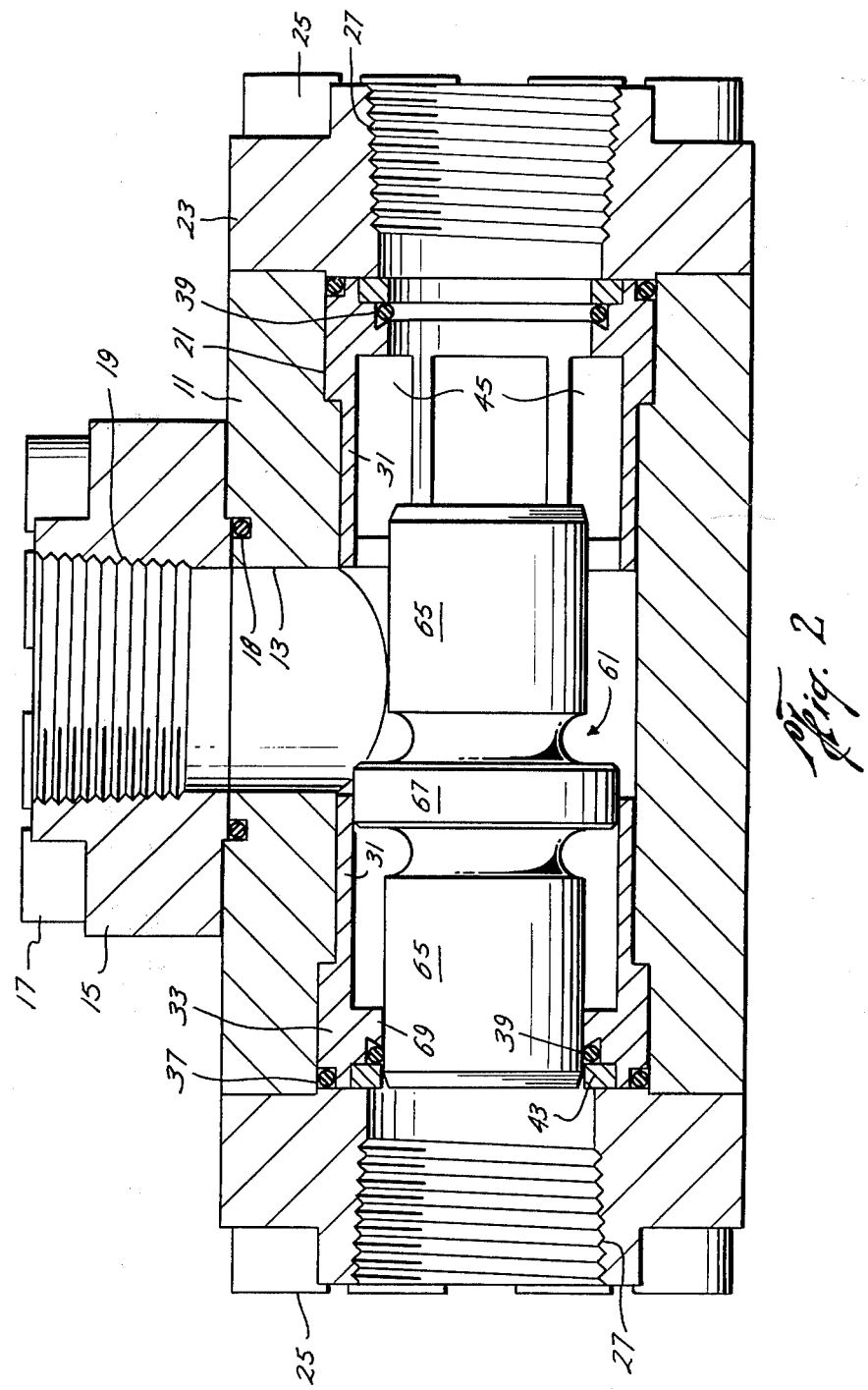

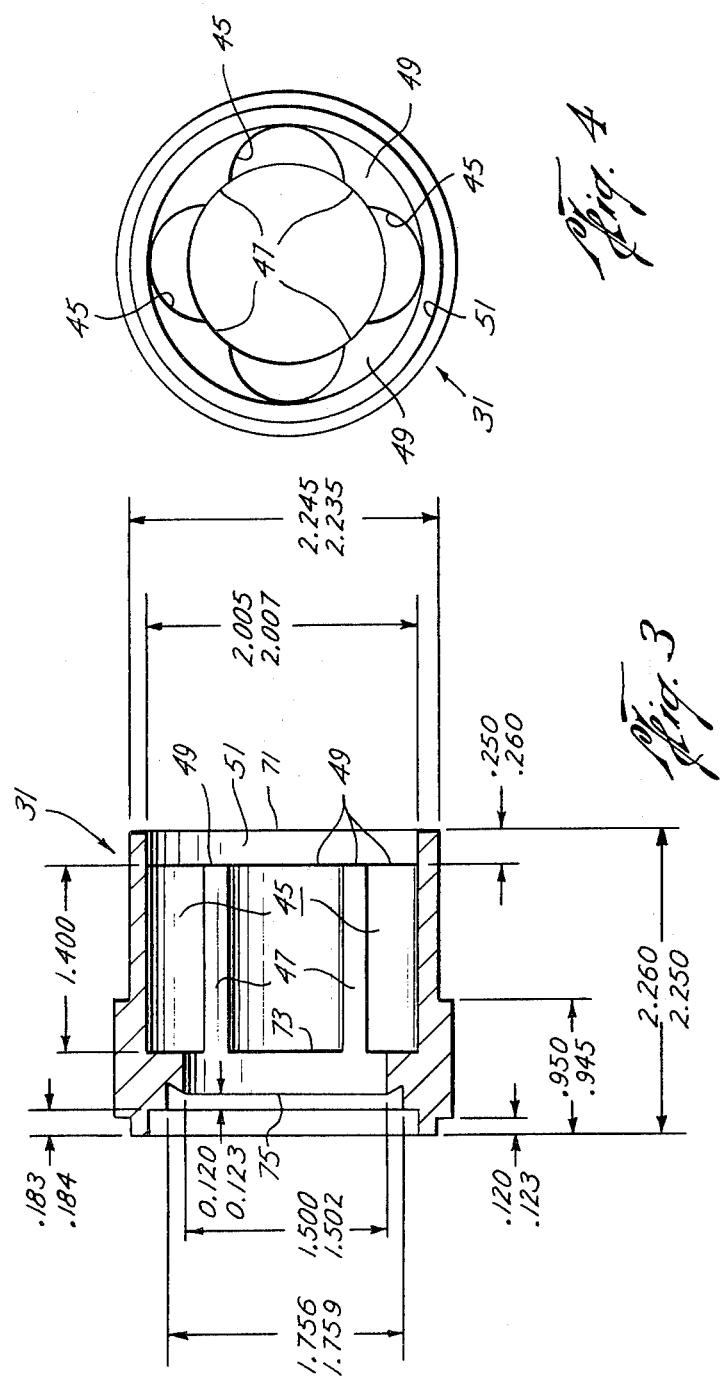

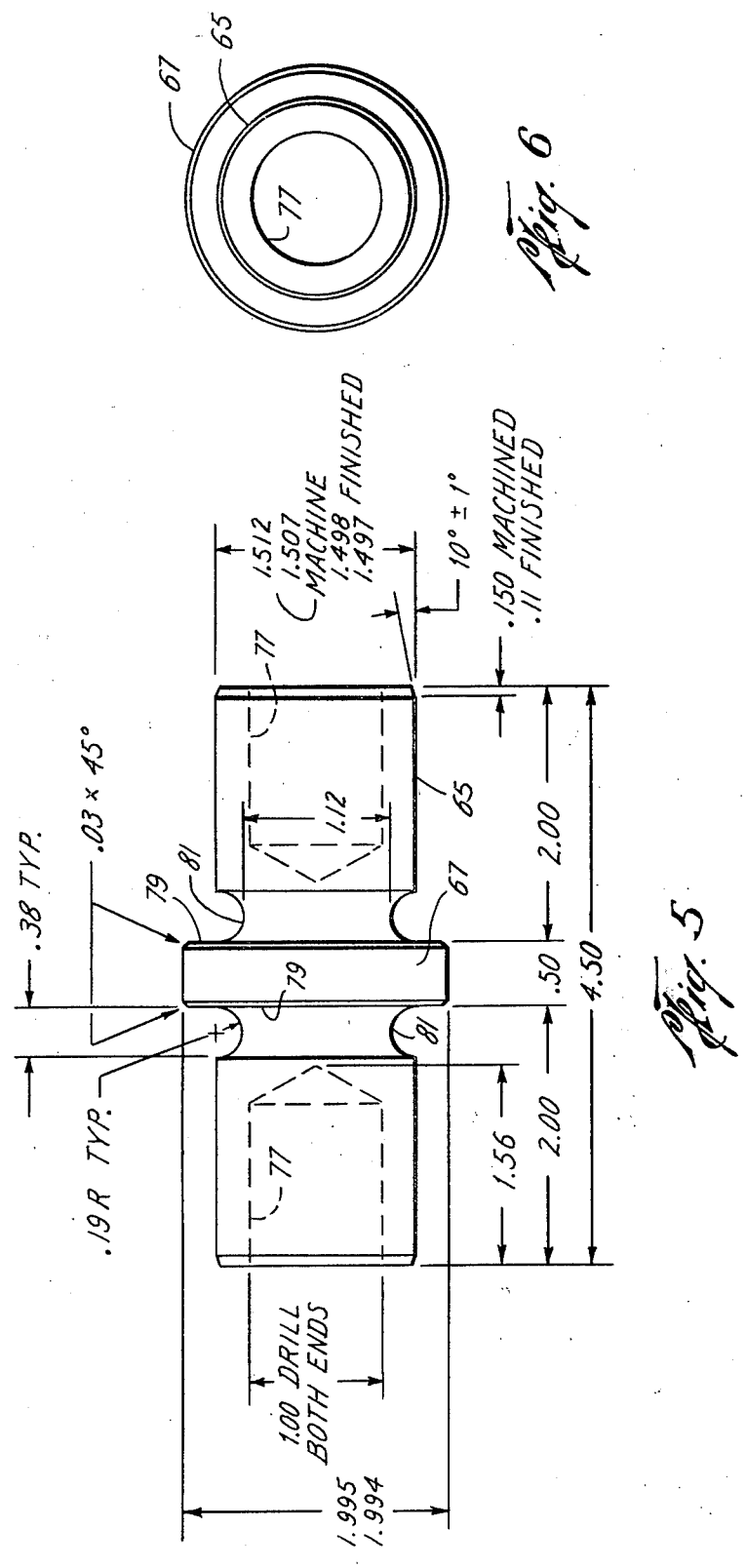

CUSHIONED SHUTTLE VALVE

BACKGROUND OF THE INVENTION

This invention relates to valves, and more particularly to shuttle valves. The invention is an improvement upon shuttle valves of the type made and sold by applicant's assignee illustrated in the leaflet entitled: "Hydraulic Shuttle Valves, Specification Sheet Number 103, Gilmore Valve Company", the disclosure of which is incorporated herein by reference to show typical dimensions. See especially the 1½" Shuttle Valve, Assembly Part No. 10-50003 (Drawing No. 22404). See also U.S. Pat. No. 3,533,431-Kuenzel and Gilmore, assigned to applicant's assignee, for another improvement in such valves.

Such shuttle valves may be employed in connection with underwater oil field equipment. For example, the lower ends of two hydraulic fluid accumulators (tanks with air space in the top) may be tied to the inlets of a shuttle valve. Each of two high pressure flow lines feeding the accumulators may be connected thereto between the shuttle valve and one of the tanks. The outlet of the shuttle valve will supply fluid from whichever one of the flow lines has the higher pressure.

It is especially important that underwater shuttle valves have a long trouble-free life because of their inaccessability. Due to the high working pressures, up to several thousand (e.g. 5000) psi, the possible differential pressure on such shuttle valves is very high. Sometimes the resulting high momentum of a shuttle as it moves from one seat to another creates enough impact to break or crack the cage or cause it to be warped, thus disrupting proper valve operation.

SUMMARY OF THE INVENTION

As the shuttle in such construction moves toward one of the inlet seats, fluid is trapped between the collar, cage and dashpot lip, and can escape only through the capillary passage (a few thousandths of an inch radial clearance) between the collar and lip, thus, hydraulically slowing the shuttle travel before it reaches the cage stop shoulders.

The action of the invention is similar to that of a hydraulic shock absorber. It is also similar to the action of a hydraulically cushioned slush pump valve such as those disclosed in the publication entitled: "The Composite Catalog of Oilfield and Pipeline Equipment", 20th Edition (1954), page 187, American "Hydra Cushion" Slush Pump Valves and Seats, and in U.S. Pat. Nos.
  2,197,455—Volkin
  2,605,080—Rea
However it will be noted that in the foregoing slush pump valve constructions, the dashpot is provided downstream from the valve seat. This may cause a certain amount of uncertainty as to whether or not the dashpot will be full of liquid if the valve closes before the dashpot becomes engaged.

Some indication of the difference between having the dashpot upstream and downstream is given by the following discussion appearing in U.S. Pat. No. 2,811,979, Presnell, with respect to a shuttle valve controlling flow to a controlled mechanism from a service system and an emergency system.

"One of the most serious disadvantages of prior shuttle valves was their inability to shuttle promptly against a blocked fluid line. Thus, when shuttling against a blocked line, say a blocked service system line, the shuttle spool would undergo rapid movement until the service port had been sealed off from the middle port whereupon trapped fluid would bring the shuttle spool to a sudden and substantially complete stop. Further movement of the shuttle spool could occur only as a result of leakage, between the shuttle spool and cylinder wall, of the trapped fluid displaced by the shuttle spool. Since the shuttle spool had a close sliding fit within the cylinder, the rate of such leakage, and hence the rate of further shuttle spool movement was very slow. Owing to the fact that in such conventional shuttle valves, the length of the shuttle spool must be such that one end port has to be sealed off before the other is freely communicated with the middle port, a delay of several seconds might occur before the shuttle spool had moved sufficiently to establish free communication between the emergency port and the middle port."

Similar discussion is to be found at the end of U.S. Pat. No. 2,654,564, Pech.

The problem referred to by Presnell and Peck is, of course, only an occasional one. Normally, prior shuttle valves, even through fitting closely within their bodies, would have no dashpot action, since there would be a passage for fluid to flow through the valve outlet, and no fluid would be trapped to create a dashpot action. This would appear to be the case for example in shuttle valve constructions as shown in U.S. Pat. Nos.:
  1,529,384—Adams
  1,686,310—Beebe
  1,795,386—Beebe
  2,445,505—Ashton
  2,551,045—Parker
  2,651,491—Ashton, et al
  2,685,295—Boosman According to the present invention, fluid is trapped in the annulus between the shuttle and cage when the outer end of the shuttle enters the seat to largely close off the annulus at one end and the stop collar on the shuttle enters the cage lip to substantially retard flow from the other end of the annulus.

Heretofore the problem of shuttle valve impact has been attacked by lightening the shuttle and providing rubbber cushions, in the form of thick seating elements, as shown in U.S. Pat. No. 3,038,487, Gardner. It may be that such cushioning will solve the impact problem while at the same time creating another such as deterioration of the seal ring due to repeated blows. This problem, i.e. the limitation on the pressure which can be applied to the rubber sealing element, is mentioned in the aforementioned United States patent to Peck, which discloses a metal to metal seat to ultimately take the axial load imposed on the shuttle, thereby to limit the pressure on the rubber seal ring, so that "the rubber is prevented from being overloaded, cut, or extruded by the action of high pressure fluid. " (col. 41 18–20)

It may appreciated, therefore, that there is advantage to applicant's hydraulic cushion over the rubber cushion of the Gardner construction.

Although, as disclosed in U.S. Pat. No. 2,408,799, Melichar, shuttle valves may be employed for controlling alternate sources of elastic fluid such as air, it will be appreciated that the present invention, employing a hydraulic dashpot with a capillary pressure relief passage, is primarily intended for use in controlling the flow of hydraulic fluid, although certain aspects of the invention may find utility in connection with the control of elastic fluids.

BRIEF DESCRIPTION OF THE DRAWINGS

For a detailed description of a preferred embodiment of the invention, reference will now be made to the accompanying scale drawings. The conventions of the United States Patent and Trademark Office for representation of materials have been employed, from which it will be seen that the entire valve is made of metal, typically steel, except for the O-ring seals which are preferably made of an elastimer such as rubber.

FIGS. 1 and 2 are axial sections through a shuttle valve incorporating the invention, respectively showing the shuttle at commencement of cushioning and in full closed position;

FIG. 3 is an axial section through the cage of the valve shown in FIG. 1;

FIG. 4 is an end view of the cage shown in FIG. 2;

FIG. 5 is an elevation of the shuttle shown in FIG. 1; and

FIG. 6 is an end view of the shuttle shown in FIG. 5.

DESCRIPTION OF PREFERRED EMBODIMENT

Figure 1:
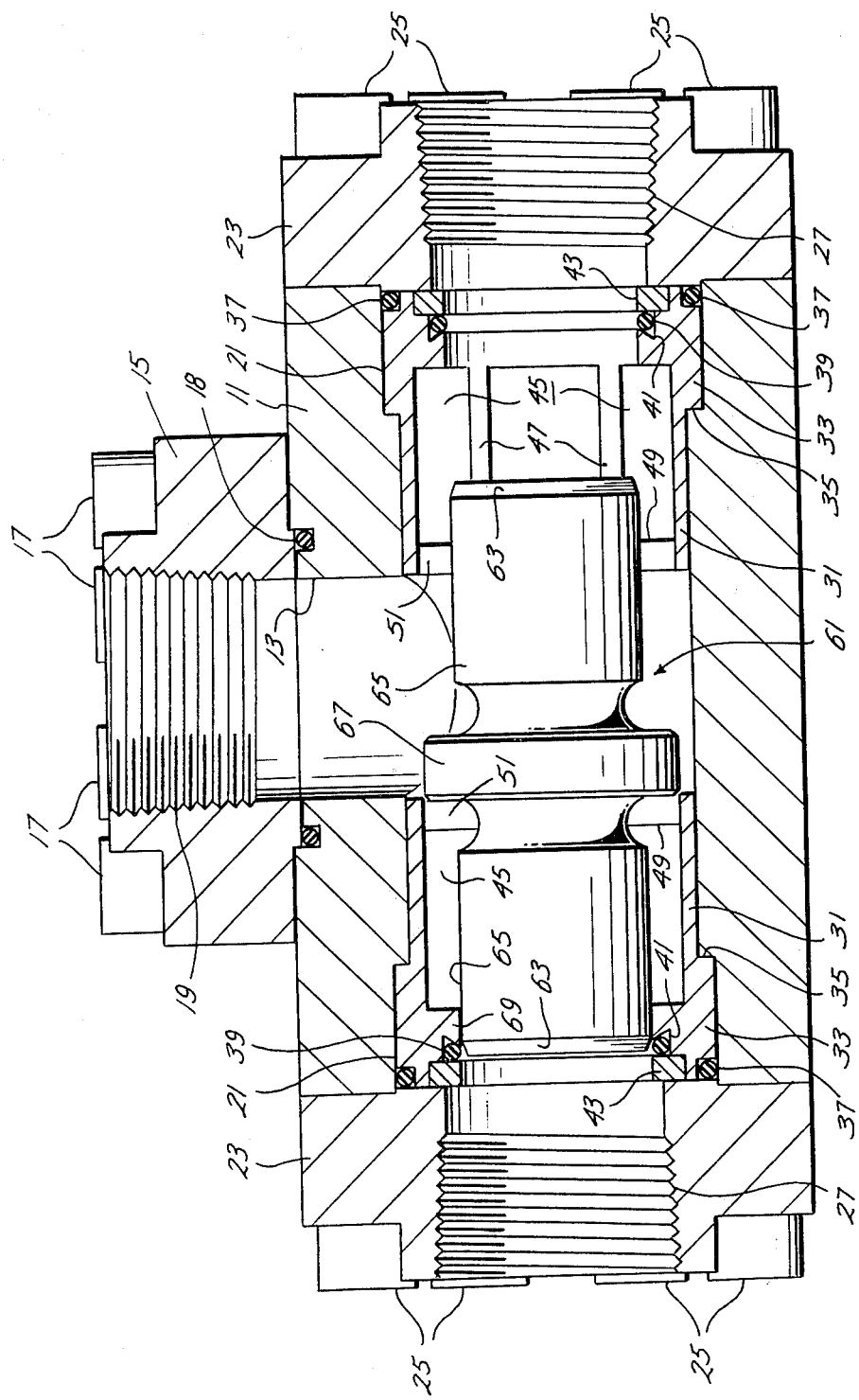

Referring to FIGS. 1 and 2, there is shown a shuttle valve including a tubular body 11 having a transverse outlet port 13 with a connector ring 15 secured thereabout by cap screws 17. Ring 15 is sealed to the body by O-ring 18. Ring 15 is internally threaded at 19. Viewed in cross section, the outer periphery of body 11 is square, so that connector ring 15 seats against a flat surface.

Body 11 is symmetrical about the axis through port 13, so that like ports to the left and right of such axis will be given like numbers. Body 11 has two coaxial inlet ports 21. Connector rings 23 are secured to the body about ports 21 by cap screws 25. Rings 23 are internally threaded at 27.

A cage 31 having an external radial flange 33 is telescopically disposed within each inlet port 21, with its flange clamped between the adjacent connector ring and an outwardly facing shoulder 35 in the body. O-rings 37 seal the inlet connector rings to the body.

Each cage has an inwardly protuberant O-ring 39 secured to its outer end, providing a valve seat. Each O-ring 39 is positioned in an annular rabbet 41 adjacent the outer end of the cage and is held in place by a ring 43 captured between the end of the cage and the adjacent connector ring.

Inwardly of the seat, each cage is axially grooved at 45 (see also FIGS. 3 and 4). The grooves provide fluid flow passages. Ribs 47 left between the grooves provide guide bearings. The inner ends of the ribs form stop shoulders 49. Inwardly of the stop shoulders, each cage is provided with a skirt or lip 51 forming a dashpot cylinder.

Axially slidably disposed within the valve body inside the cages is a shuttle 61 having the form of a cylindrical plug. Each end of the plug is tapered, as shown at 63. Bearing ribs 47 of the cages provide support for the shuttle, cylindrical outer portions 65 of which have an outer diameter only slightly smaller than the diameter of the cylindrical surface of which the inner peripheres of the ribs are segments. The shuttle is adapted to slide axially on the ribs in the direction toward one or the other of seats 39 according to whether the pressure on the one or the other of its ends is lower than that on the opposite end. For example, if the pressure on the right hand end is higher, the shuttle moves to the left to engage the seat on the left, as shown in FIG. 2. Tapered end 63 of the shuttle first engages and compresses seat 39 as shown in FIG. 1 and then passes through the seat so that sealing takes place about cylindrical outer periphery 65 as shown in FIG. 2. The shuttle is brought to rest by collar 67 around the middle of the shuttle engaging stop shoulders 49.

When the shuttle moves from a position closing one inlet port to a position closing the other inlet port, e.g. from right to left, and collar 67 first enters the left hand cage, as shown in FIG. 1, it will be seen that fluid (liquid) is trapped in the annulus between the cage and shuttle. Such annulus comprises the annularly disposed spaces provided by grooves 45 plus the clearance between outer periphery 65 of the shuttle and the inner peripheries of ribs 47. At the outer end of this annulus, the path for fluid escape is between the inner periphery of the cage at 69 and the outer periphery 65 of the shuttle. As appears from FIGS. 3 and 5, this is a very close fit, a few thousandths on diameters. Even this passage becomes blocked entirely when the shuttle engages seat 39, which occurs just as the collar enters the cage. Thereafter, the fluid must escape at the inner end of the cage between lip 51 and the outer periphery of collar 67; the clearance there, a few thousandths of an inch, is set to provide the desired cushioning or dashpot action, gradually bringing the shuttle to rest.

FIG. 1 shows more clearance than actually exists, but the precise moment of engagement of the shuttle with seat 69 is indicated by the dimensions given in FIGS. 3 and 5. Thus, FIG. 5 shows that the length of the shuttle from its left hand end to collar 67 is 2.00 inches. From FIG. 3 one finds that the distance from inner end 71 of skirt or lip 51 to outer end 73 of grooves 45 is only 1.400 plus 0.250 (0.260) inches, which is about 1.650 inches, so that the outer end of the shuttle is well inside the ungrooved part of the cage adjacent to the seat when the collar starts to enter the cage. FIG. 3 also shows that the distance from outer end 71 of the cage to edge 75 of rabbet 41, wherein lies O-ring seat 39, is only 2.260 (2.250) minus 0.183 (0.184) minus 0.120 (0.123) inches, which is about 1.957 inches, so that just as the collar enters the cage, the tapered end of the shuttle starts to pass over the rabbet in which O-ring 39 is disposed. O-ring 39 has a relaxed diameter of about 0.139 inches plus or minus 0.004 inches. Since the radial depth of the rabbet is about 0.128 inches, the O-ring will protrude at least 0.007 inches radially and will contact the tapered end of the shuttle almost immediately when the latter crosses the rabbet.

FIGS. 3 and 5 also show that the radial clearance between the outer periphery of collar 67 and the inner periphery of lip 51 is between (2.005-1.995) inch or (0.010) inch and (2.007-1.994) inch or (0.013) inch on diameters, i.e. 5 to 7 thousandths of an inch radially. This is the clearance through which the fluid trapped in cage grooves 45 must escape. A clearance of this order of magnitude, e.g. 0.001 to 0.032 inch, may be referred to as a capillary clearance.

Certain other structural details of the invention may also be mentioned. As shown in FIG. 5 and 6, the ends of the shuttle are hollow, being bored out at 77. This reduces the mass of the shuttle and hence reduces the impact of the shuttle when it strikes stop shoulders 49 of the cage. The collar has slightly beveled edges 79; however, the cage and shuttle are dimensional so that edges 79 should normally never have to perform any guide function when the shuttle enters one or the other of the cages. The shuttle is provided with stress relief grooves 81 at each side of the collar so as to prevent cracking when the collar impacts against stop shoulders 45. The cage is machined from bar stock made, e.g., of Armco 17-4 PH steel, to provide great strength for resistance to impact.

When the valve is fully seated to close one inlet port, e.g., the left hand inlet port as shown in FIG. 2, grooves 45 provide passages for fluid flow past outer periphery 65 of the shuttle, such fluid passages emptying into the annular fluid passage between the shuttle and lip 51, fluid leaving the latter passage entering the interior of the valve body and exiting through outlet port 13 and connector ring 15. Note from the scale drawings, especially FIGS. 3 and 4, that the bottoms of grooves 45 are tangent to a cylindrical surface which is a continuation of the inner peripheral cylindrical surface of lip 51, so that collar 67 (FIG. 2) does not completely block the ends of grooves 45 even when it is engaged with the ends of ribs 47; furthermore, bevel 79 keeps the maximum diameter part of collar 67 away from the ends of ribs 47. Therefore, although closure of the valve over an inlet port is hydraulically cushioned, there is no possibility of a hydraulic lock preventing full seating of the valve.

While a preferred embodiment of the invention has been shown and described, modifications thereof can be made by one skilled in the art without departing from the spirit of the invention. For example, instead of having the collar on the shuttle fit tightly within the cage skirt to form a dashpot, the body of the valve could be fitted closely about the shuttle collar. In other words, any portion of the cage could be made integral with the body, e.g., the seal, the guides, the stops, and/or the skirt could be made integral with the body.

I claim:

1. A shuttle valve comprising a tubular body having two coaxial inlets and a transverse outlet, two tubular cages telescopically received in said body respectively in one and the other of said inlets, each cage being internally grooved leaving bearing ribs between the grooves extending in the direction of the axis of the cage, the grooves providing flow passages extending the length of the bearing ribs, a shuttle coaxial with said cages including end portions having cylindrical outer portions axially slidably engaging said bearing ribs, said shuttle including a collar between said end portions having an outer cylindrial surface of larger diameter than the inner diameter of said cages at said end portions adapted to engage the inner ends of said ribs to limit axial travel of said shuttle, each cage carrying at its outer end seal means adapted to engage and seal with the outer periphery of an end portion of said shuttle to close the adjacent inlet port when the shuttle is moved toward such port, each cage carrying at its inner end an annular lip having a cylindrical inner periphery adapted to receive said collar with capillary clearance, said flow passages formed by said grooves between said ribs being always in communication with said outlet even when said shuttle closes the adjacent inlet port, such communication being from the deepest portions of said grooves through said capillary clearance when said collar is engaged with the ends of the ribs forming such flow passages.

2. Valve according to claim 1, the outer peripheral edges of said collar being bevelled to keep the maximum diameter portion of the collar out of contact with the ends of said ribs, thereby to increase the area for fluid flow at the juncture of the inner ends of the flow passages adjacent the collar and the outer periphery of the collar when engaged with the ribs forming the latter flow passages.

3. Valve according to claim 1, said lips being axially separated leaving the outer periphery of the collar out of contact with the lips when the shuttle moves through the midportion of its travel from one inlet to the other.

4. Valve according to claim 1, said shuttle being free to move axially from one inlet to the other with the extent of such axial movement being limited solely by said inner ends of said ribs.

5. Valve according to claim 1, the entire surface of the shuttle upstream of the shuttle from said seal means being exposed to upstream pressure of the respective inlet port when the shuttle closes such port.

* * * * *

UNITED STATES PATENT AND TRADEMARK OFFICE
CERTIFICATE OF CORRECTION

PATENT NO. : 4,253,481

DATED : March 3, 1981

INVENTOR(S) : Edward C. Sarlls, Jr.

It is certified that error appears in the above—identified patent and that said Letters Patent is hereby corrected as shown below:

Column 1, line 52: change "Volkin" to -Volpin-.
Column 2, line 21: change "Peck" to -Pech-.
Column 2, line 35: change "2,685,295" to -2,685,296-.
Column 2, line 51: change "Peck" to -Pech-.
Column 3, line 12: change "elastimer" to -elastomer-.
Column 3, line 63: change "peripheres" to -peripheries-.
Column 6, line 5: change "cylindrial" to -cylindrical-.

Signed and Sealed this

Eighteenth Day of August 1981

[SEAL]

Attest:

GERALD J. MOSSINGHOFF

Attesting Officer  Commissioner of Patents and Trademarks